(12) United States Patent
Pigeon et al.

(10) Patent No.: US 12,005,523 B2
(45) Date of Patent: Jun. 11, 2024

(54) PROCESS FOR NANOSTRUCTURING THE SURFACE OF A MATERIAL BY LASER

(71) Applicants: Universite Jean Monnet Saint Etienne, Saint-Etienne (FR); Centre National de la Recherche Scientifique (CNRS), Paris (FR)

(72) Inventors: Florent Pigeon, Saint Etienne (FR); Anthony Abou Saleh, Saint-Etienne (FR); Jean-Philippe Colombier-Cinquantin, Saint-Heand (FR); Florence Garrelie, Saint-Etienne (FR)

(73) Assignees: Universite Jean Monnet Saint Etienne (FR); Centre National de la Recherche Scientifique (CNRS) (FR)

( * ) Notice: Subject to any disclaimer, the term of this patent is extended or adjusted under 35 U.S.C. 154(b) by 711 days.

(21) Appl. No.: 17/257,134

(22) PCT Filed: Jul. 12, 2019

(86) PCT No.: PCT/FR2019/051757
§ 371 (c)(1),
(2) Date: Dec. 30, 2020

(87) PCT Pub. No.: WO2020/012137
PCT Pub. Date: Jan. 16, 2020

(65) Prior Publication Data
US 2021/0121983 A1   Apr. 29, 2021

(30) Foreign Application Priority Data
Jul. 13, 2018 (FR) ...................................... 1856499

(51) Int. Cl.
*B23K 26/00* (2014.01)
*B23K 26/0622* (2014.01)
(Continued)

(52) U.S. Cl.
CPC ...... *B23K 26/3584* (2018.08); *B23K 26/0006* (2013.01); *B23K 26/0624* (2015.10); *B23K 26/08* (2013.01); *B23K 2103/52* (2018.08)

(58) Field of Classification Search
CPC ............ B23K 26/3584; B23K 26/0624; B23K 26/0006; B23K 26/08; B23K 2103/52; B23K 26/3568; B23K 26/355
(Continued)

(56) References Cited

U.S. PATENT DOCUMENTS

2004/0076813 A1* 4/2004 Han ................... B23K 26/0006
                                                             428/917
2006/0169677 A1* 8/2006 Deshi ................... B23K 26/382
                                                             219/121.7
(Continued)

FOREIGN PATENT DOCUMENTS

DE   102005043495 A1   3/2007
WO   2007012215 A1     2/2007

OTHER PUBLICATIONS

Periodical structures induced by femtosecond laser on metals in air and liquid environments Catalina Albu,*, Adrian Dinescu, Mihaela Filipescu, Magdalena Ulmeanu, Marian Zamfirescu, Applied Surface Science 278 (2013) 347-351 (Year: 2013).*

(Continued)

*Primary Examiner* — Alison L Hindenlang
*Assistant Examiner* — Erica Hartsell Funk
(74) *Attorney, Agent, or Firm* — Lerner David LLP

(57) ABSTRACT

The invention relates to a process for nanostructuring the surface of a solid material in order to form a regular pattern of nanostructures on said surface, comprising:
irradiating the surface by a plurality of pulse trains (20) of a femtosecond laser beam:
each pulse train (20) comprises at least two pulses (21, 22), (Continued)

Figure 1:
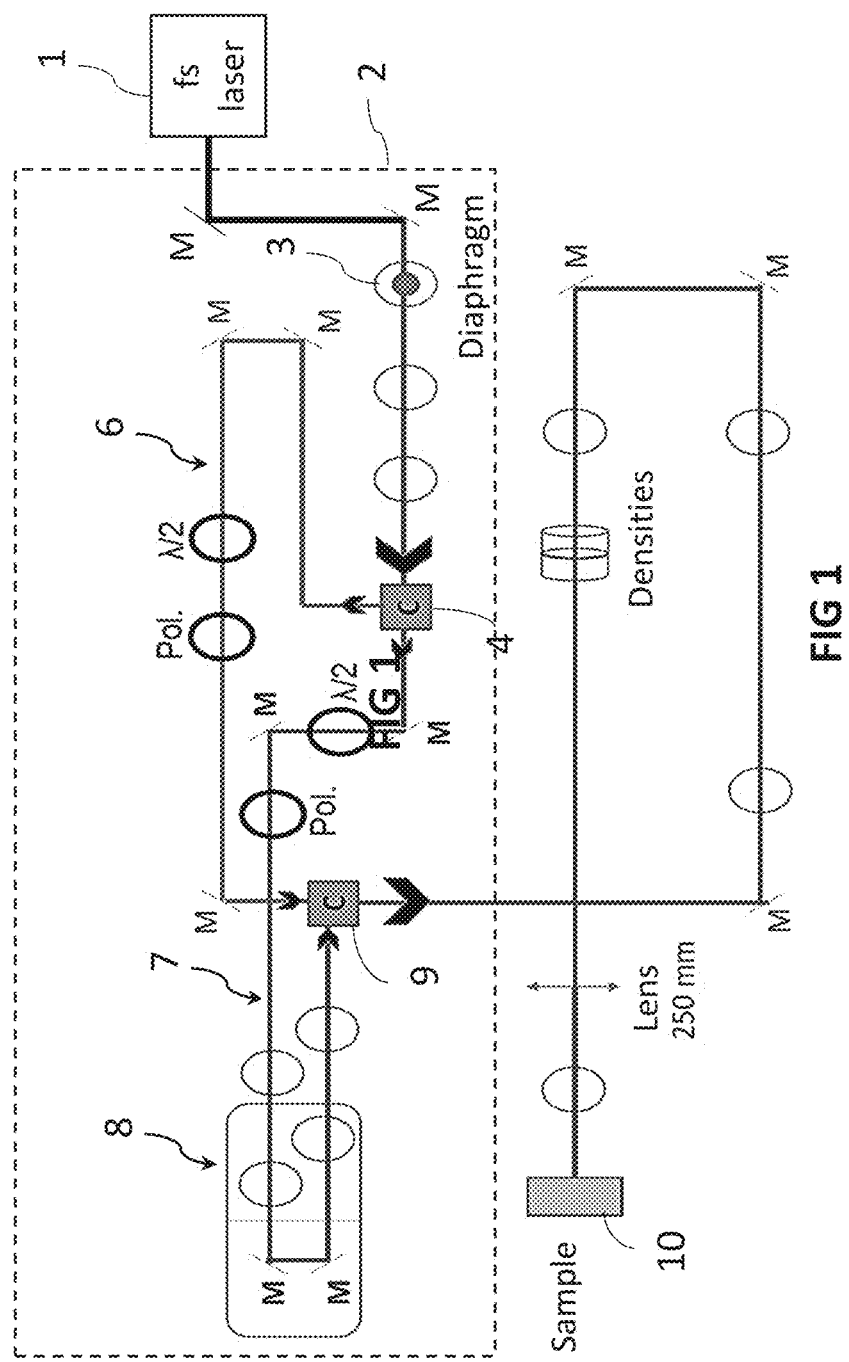

each pulse has a peak fluence, and a sum of the peak fluences of the pulses of a pulse train is between 10% and 70% of a threshold fluence corresponding to a material ablation threshold for one pulse for said material, two consecutive pulses of a pulse train are separated by a peak-to-peak duration $\Delta T$ between 500 fs and 150 ps, two consecutive pulse trains are separated by a duration greater than 10 $\Delta T$, obtaining a regular pattern of nanostructures on said portion of surface, having a spatial periodicity lower than 130 nm.

14 Claims, 7 Drawing Sheets

(51) Int. Cl.
*B23K 26/08* (2014.01)
*B23K 26/352* (2014.01)
*B23K 103/00* (2006.01)

(58) Field of Classification Search
USPC .......................................................... 264/400
See application file for complete search history.

(56) References Cited

U.S. PATENT DOCUMENTS

| 2009/0012523 | A1* | 1/2009 | Ruuttu | C23C 14/28 |
| | | | | 606/76 |
| 2011/0240611 | A1* | 10/2011 | Sandstrom | G02B 27/42 |
| | | | | 219/121.61 |
| 2012/0322236 | A1* | 12/2012 | Lei | B23K 26/40 |
| | | | | 257/E21.602 |
| 2016/0064892 | A1 | 3/2016 | Courjaud | |

OTHER PUBLICATIONS

Precision micromachining of CVD diamond films J.K. Park ,*, V.M. Ayres , J. Asmussen , K. Mukherjee, Diamond and Related Materials 9 (2000) 1154-1158 (Year: 2000).*

Saleh, Sub-100 nm 2D nanopatterning on a large scale by ultrafast laser energy regulation, Nanoscale, 2020, 12, 6609-6616 (Year: 2020).*

Kovacevic, Surface nanopatterning of Al/Ti multilayer thin films and Al single layer by a low-fluence UV femtosecond laser beam, Applied Surface Science vol. 326, Jan. 30, 2015, pp. 91-98 (Year: 2015).*

French Search Report for Application No. 1856499, dated Mar. 29, 2019, 2 pages.

Hashida et al., Ablation thresholds of metals with femtosecond laser pulses, Proceedings of SPIE, Jun. 2001, pp. 178-185, vol. 4423.

International Search Report for Application No. PCT/FR2019/051757, dated Nov. 13, 2019, 2 pages.

Liu, Simple technique for measurements of pulsed Gaussian-beam spot sizes, Optics Letters, May 1982, pp. 196-198, vol. 7, No. 5.

Okamuro et al., Laser fluence dependence of periodic grating structures formed on metal surfaces under femtosecond laser pulse irradiation, Physical Review B 82, Oct. 2010, 165417-1-165417-5 (5 pages).

* cited by examiner

PROCESS FOR NANOSTRUCTURING THE SURFACE OF A MATERIAL BY LASER

CROSS-REFERENCE TO RELATED APPLICATIONS

The present application is a national phase entry under 35 U.S.C. § 371 of International Application No. PCT/FR2019/051757, filed Jul. 12, 2019, published in French, which claims priority from French Patent Application No. 1856499 filed Jul. 13, 2018, all of which are incorporated herein by reference.

BACKGROUND OF THE INVENTION

The present invention relates to a process for nanostructuring the surface 5 of a material by laser. More precisely, the process aims to form a regular pattern of nanostructures on said surface by means of a femtosecond laser beam.

The present invention relates to a process for nanostructuring the surface of a material by laser. More precisely, the process aims to form a regular pattern of nanostructures on said surface by means of a femtosecond laser beam.

The presence of nanostructures on a surface can have many applications. Indeed, this presence of nanostructures modifies many properties of the surface that carries them. For example, the wetting can be modified, which can be of interest in biomedical applications. In particular, it is then possible to create very hydrophobic surfaces, or hydrophilic surfaces, which can then be used in micro-channels to separate fluids. It is also possible to create surfaces with improved friction properties, for example for sliding skids such as skis, or to limit the wear between parts in contact. The interaction of light with the surface can be modified, which can change the colour of the material such as perceived by an observer, or modify the absorption capacities of the light, which can have an application in the field of renewable energies, and in particular photovoltaic energy. In fact, a nanostructured surface can be highly selective in wavelength, which makes it possible for example to absorb only certain wavelengths. Other applications can benefit from a nanostructured surface, such as for example in the field of plasmonics, photonic crystals or near-field optics.

The nanostructuring of a surface can be carried out by different methods, for example by photolithography, X-rays, electronic beam, ion beam, particle beam, or mechanical methods. The last few years have seen the emergence of the use of a femtosecond laser beam to carry out nanostructures on the surface of a material, which is called nanostructuring a surface. Indeed, using a femtosecond laser has several advantages. In particular, the equipment is simplified since it is not necessary to work in a vacuum or in a white room. Moreover, using a laser does not require any contact, and it is possible to work on surfaces that have different shapes. Patent application US 2012/0322236 A1 presents for example a process for etching a substrate that uses pulse trains.

Ablation etching of material by simply focusing the femtosecond laser only allows to obtain laser-inscribed surface structures of which the characteristic size is greater than or equal to the diameter of the laser beam. This technique therefore does not make it possible to obtain nanostructures of very small size. Furthermore, the process for manufacturing is long, since each cavity in the surface has to be created individually.

Another approach makes it possible to obtain nanostructures of very small size, i.e. with a characteristic size much less than the diameter of the laser beam, by drawing on the self-organisation of nanostructures under the effect of a femtosecond laser beam. This involves irradiating the surface with the femtosecond laser beam with less energy than for obtaining laser-inscribed surface structures. Laser-irradiated surface structures are then obtained.

This approach makes it possible in particular to obtain laser-induced periodic surface structures (LIPSS). The LIPSS obtained until now take the form of ripples, formed by an alternation of peaks and troughs, with a spatial periodicity typically between 200 nm and 1000 nm according to the materials, the wavelength of the femtosecond laser, the polarisation of the optical wave, and possibly the number of pulses and the incidence of the laser beam. For example, patent applications WO 2007/012215 A1 and DE 10 2005 043 495 A1 describe processes that make it possible to obtain LIPSS, by using a polarised laser pulse. However, this approach does make it possible to obtain structures that have low spatial periodicity, less than 100 nm.

PRESENTATION OF THE INVENTION

The invention has for purpose to make it possible to obtain a regular pattern of periodical nanostructures having a spatial periodicity lower than 130 nm, and to make it possible to obtain periodical surface structures induced by laser that have several axes of symmetry in the plane of the irradiated surface, with the latter able to be of a large size.

To this effect, a process for nanostructuring the surface of a solid material in order to form a regular pattern of nanostructures on said surface is proposed, said process comprising the steps of:
supplying the solid material, said material comprising a surface;
irradiating a portion of the surface by a femtosecond laser beam, comprising a plurality of pulse trains, wherein:
each pulse train comprises at least two pulses,
each pulse has a peak fluence, and a sum of the peak fluences of the pulses of a pulse train is between 10% and 70% of a threshold fluence corresponding to a material ablation threshold for one pulse for said material,
two consecutive pulses of a pulse train are temporally separated by a peak-to-peak duration $\Delta T$ between 500 fs and 150 ps,
two consecutive pulse trains are temporally separated by a duration greater than 10 $\Delta T$,
obtaining of a regular pattern of nanostructures on said portion of surface, having a spatial periodicity lower than 130 nm,
displacing the femtosecond laser beam on the surface in such a way as to irradiate other portions of said surface.

The process is advantageously supplemented by the following characteristics, taken individually or in any technically permissible combination:
each pulse has a peak fluence between 5% and 65% of a threshold fluence corresponding to a material ablation threshold for one pulse for said material;
the irradiating by the plurality of pulse trains on the same surface element represents a total dose less than 6 $J/cm^2$;
each portion of the surface is irradiated by at least 5 pulse trains;
each portion of the surface is irradiated by a number of pulse trains less than 500;

each pulse of a pulse train has a duration less than the duration between two consecutive pulses of the pulse train;

the material has a crystalline structure;

the material has a crystalline face-centred cubic structure;

the material is mostly constituted of metal;

the material is mostly constituted of carbon;

the material contains diamond-like carbon, and is preferably mostly constituted of diamond-like carbon;

pulses of a pulse train have different linear polarisations when said pulses arrive on the surface;

pulses of a pulse train have linear cross-polarisations;

the nanostructures obtained are nano-pits or nano-holes or nano-bumps, forming a regular lattice on the surface;

the nano-pits have a diameter between 10 nm and 40 nm, and preferably between 20 nm and 30 nm;

the nano-bumps have a height less than 60 nm;

the irradiated portions of the surface overlap partially;

the material has a thickness under its surface less than 200 nm.

The invention also relates to an assembly comprising a solid material having a crystalline structure and a system for nanostructuring the surface of a solid material in order to form a regular pattern of nanostructures having a spatial periodicity lower than 130 nm on the surface of the material, said system comprising a femtosecond laser source and a subsystem able to generate several consecutive laser pulses constituting a pulse train, said system being configured to irradiate a portion of the surface by a femtosecond laser beam comprising a plurality of pulse trains, wherein:

each pulse train comprises at least two pulses, each pulse has a peak fluence, and a sum of the peak fluences of the pulses of a pulse train is between 10% and 70% of a threshold fluence corresponding to a material ablation threshold for one pulse for said material, two consecutive pulses of a pulse train are temporally separated by a peak-to-peak duration $\Delta T$ between 500 fs and 150 ps, two consecutive pulse trains are temporally separated by a duration greater than 10 $\Delta T$, the system being configured to implement the process according to the invention.

PRESENTATION OF THE FIGURES

Figure 2A:
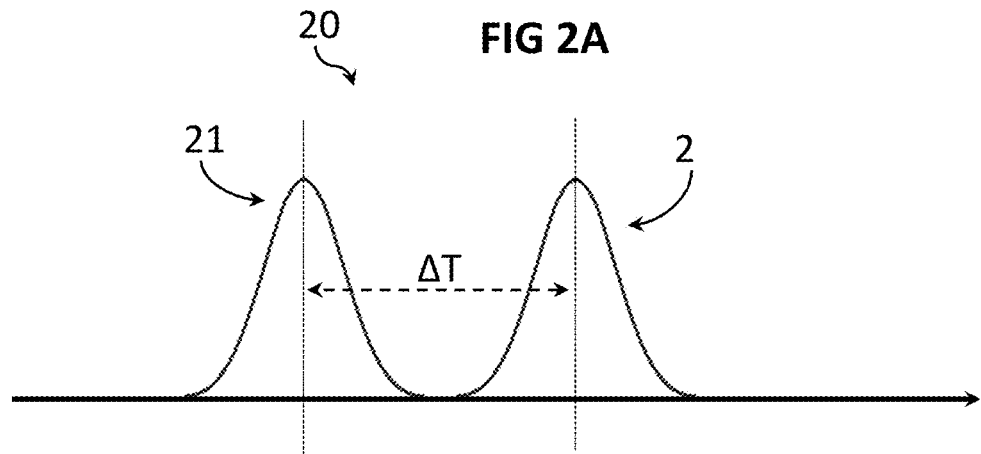
Figure 2B:
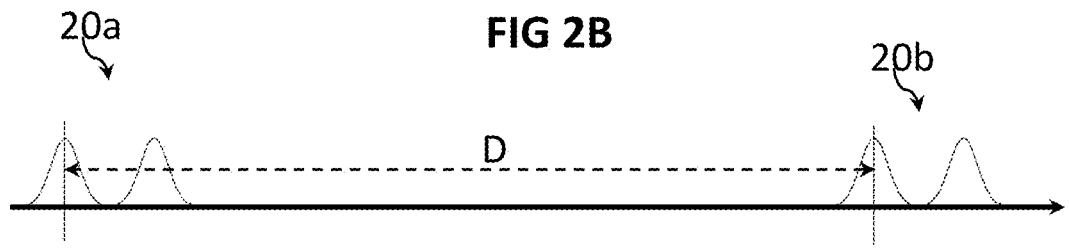
Figure 3A:
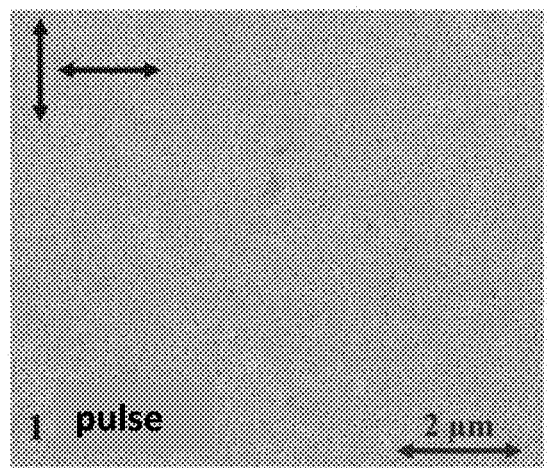
Figure 3B:
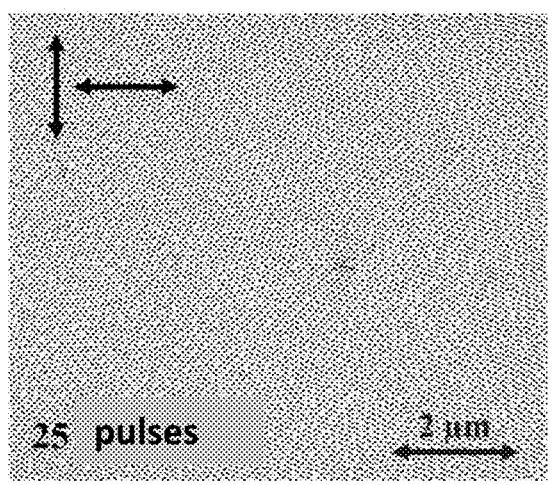
Figure 3C:
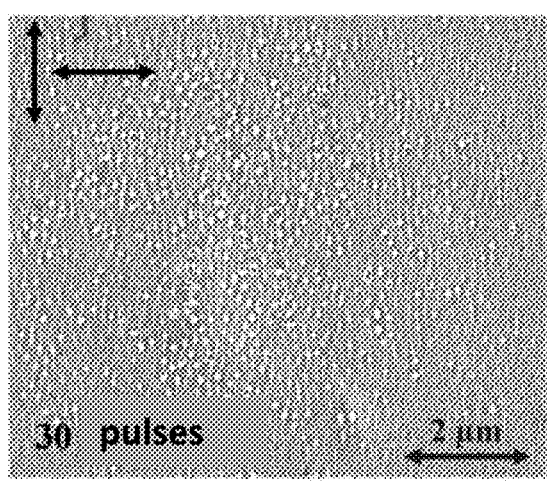
Figure 4A:
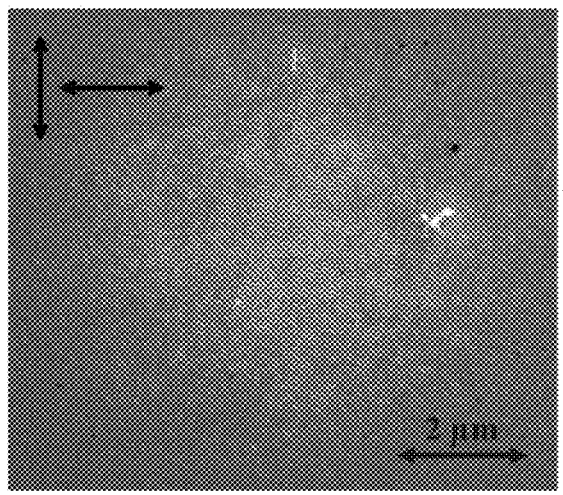
Figure 4B:
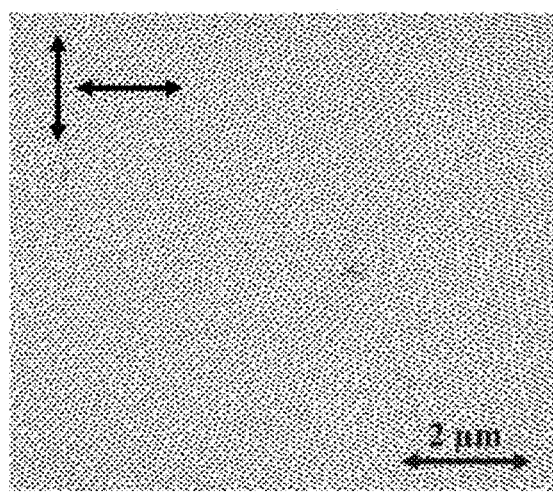
Figure 4C:
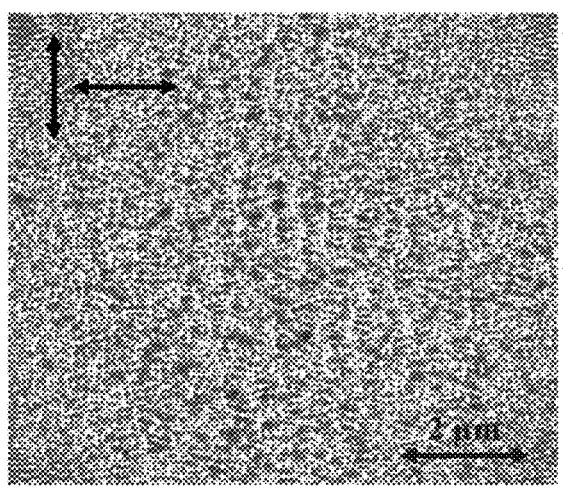
Figure 5A:
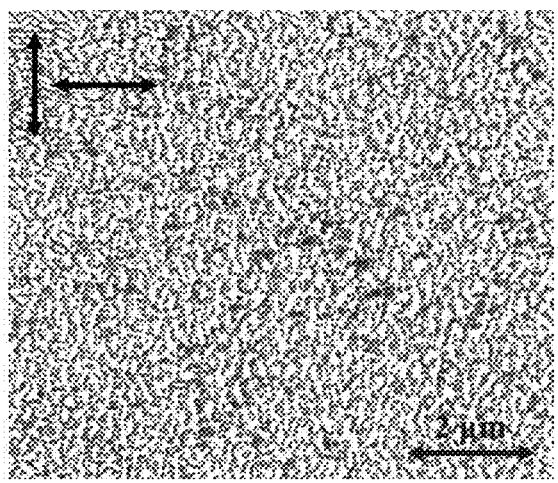
Figure 5B:
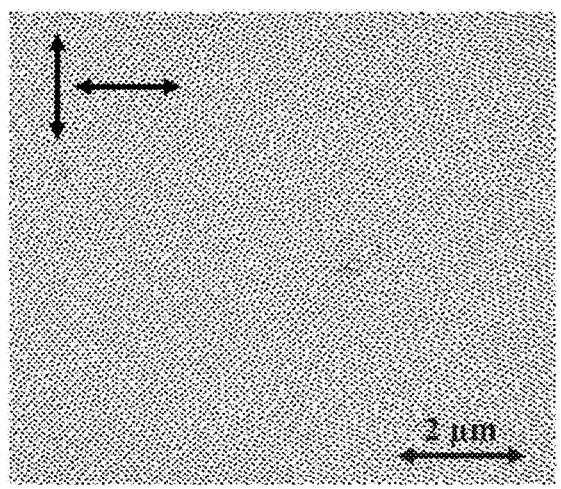
Figure 5C:
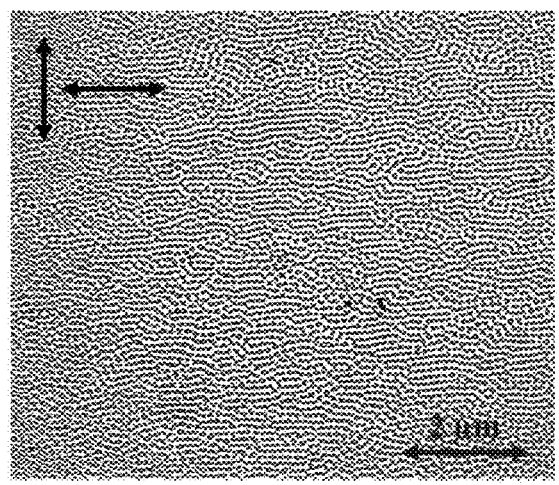
Figure 6A:
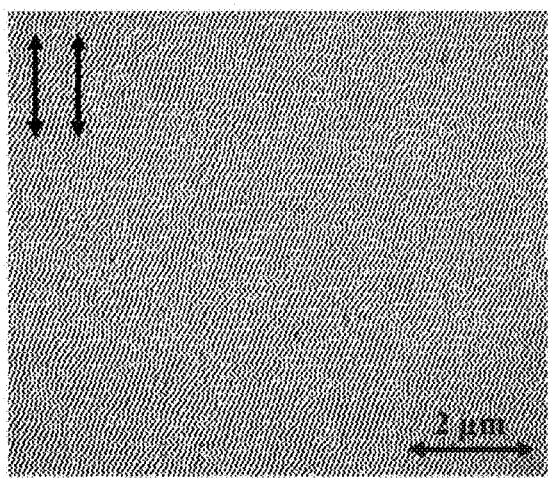
Figure 6B:
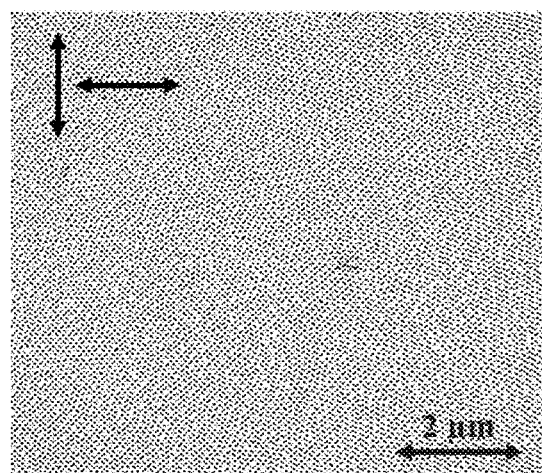
Figure 6C:
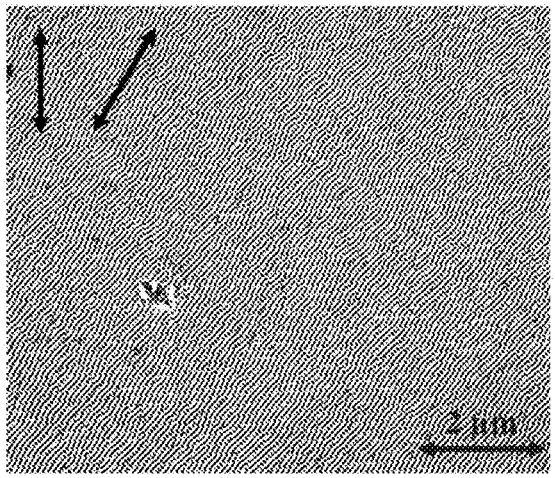
Figure 7A:
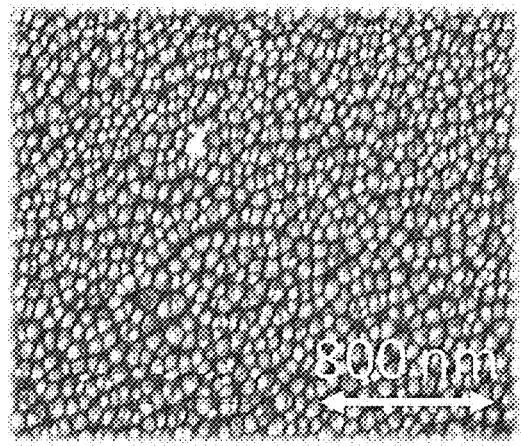
Figure 7B:
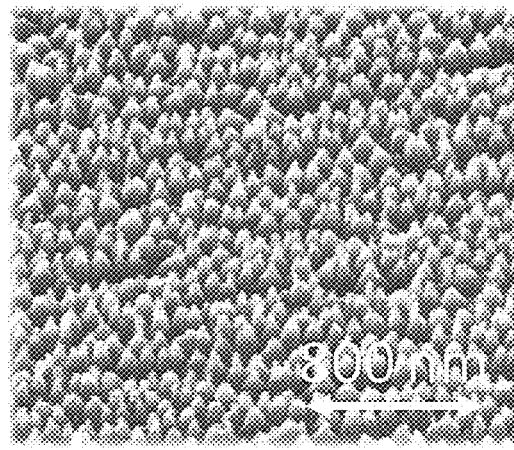
Figure 7C:
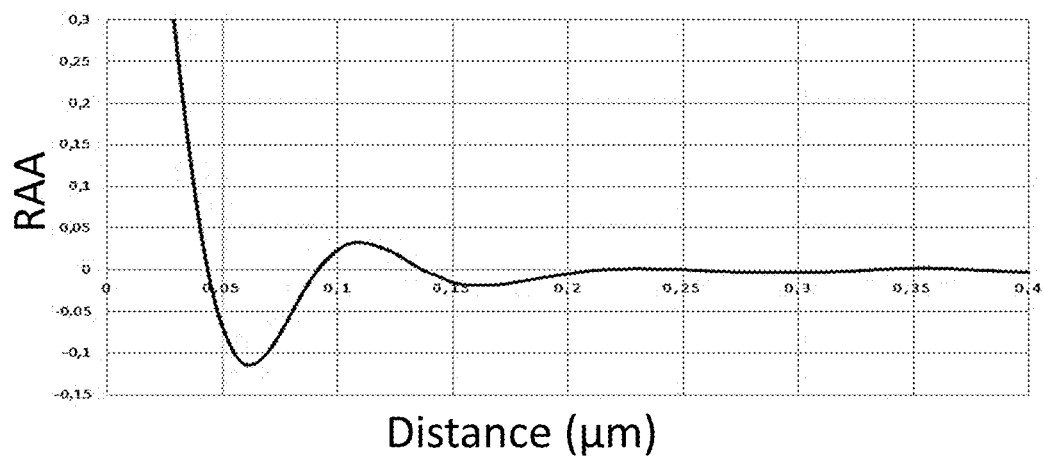

The invention shall be better understood, thanks to the description hereinafter, which relates to embodiments and alternatives according to the present invention, given as non-limiting examples and explained with reference to the accompanying diagrammatical drawings, wherein:

FIG. 1 diagrammatically shows a configuration for conditioning a femtosecond laser beam that can be used to implement a possible embodiment of the invention, FIG. 2A diagrammatically shows two consecutive pulses of a pulse train according to a possible embodiment of the invention, FIG. 2B diagrammatically shows two consecutive pulse trains in the laser beam according to a possible embodiment of the invention, FIGS. 3A, 3B, and 3C, are images showing the change in the structuring of the same surface irradiated by laser according to the number of pulse trains, FIGS. 4A, 4B, and 4C, are images showing the change in the structuring of the same surface irradiated by laser according to the fluence of the pulses, FIGS. 5A, 5B, and 5C, are images showing the change in the structuring of the same surface irradiated by laser according to the time between two pulses of a pulse train, FIGS. 6A, 6B, and 6C, are images showing the change in the structuration of the same surface irradiated by laser according to the orientation of the polarisation of each one of the pulses of a pulse train FIGS. 7A and 7B are images showing the regular pattern of nano-bumps on a diamond-like carbon irradiated by the process according to a possible embodiment of the invention;

FIG. 7C is a curve showing a radial averaged autocorrelation on an image obtained by an atomic force microscope of a surface similar to that of FIGS. 7A and 7B.

DETAILED DESCRIPTION

The invention makes it possible to obtain a regular pattern of nanostructures having a spatial periodicity lower than 130 nm, preferably (strictly) less than 100 nm, even less than 60 nm. The terms "regular pattern of nanostructures" mean the result of the organisation of nanostructures regularly and continuously covering a portion of the surface. Furthermore, the invention can make it possible to obtain a mesh of nanostructures having a spatial periodicity lower than 130 nm, preferably (strictly) less than 100 nm, even less than 60 nm. The terms "mesh of nanostructures" mean a regular lattice of nanostructures regularly and continuously covering a portion of the surface. Preferably, the regular pattern has several axes of symmetry in the plane of the irradiated surface.

FIG. 1 shows an example of a configuration of the conditioning of a femtosecond laser beam that can be used to implement the process of nanostructuring of the invention. The terms "femtosecond laser" mean a laser emitting light by pulses of a very short durations between 1 femtosecond ($10^{-15}$ s) and $5\times10^{-13}$s. The conditioning of the laser beam aims in particular to generate a pulse train that comprises very close laser pulses from a single laser pulse, generally two laser pulses forming a pulse doublet.

The initial laser beam is emitted by a femtosecond laser source 1, then passes in a subsystem 2 that makes it possible to generate several consecutive pulses that constitute a pulse train, and to set the time that separates consecutive pulses. In the configuration shown, the subsystem 2 is a so-called Mach-Zehnder configuration. The subsystem 2 shown makes it possible to generate two pulses from a single initial pulse. Other configurations can however make it possible to generate more pulses from the same single initial pulse.

The initial beam is separated into two during a conveying that makes use of several mirrors M. In the example, the beam first passes in a diaphragm 3 (which could be upstream of the subsystem 2). The iris of the diaphragm 3 is for example 6 mm. The initial beam is then separated into two secondary beams of equal intensity by a first beam splitter 4, which is non-polarising. A first secondary beam 6 and a second secondary beam 7 are obtained.

The optical paths of the secondary beams 6, 7 are different, and one is longer than the other by a length that corresponds to the temporal spacing desired between the two laser pulses. To this effect, the second secondary beam 7 passes through a delaying device 8 that extends its optical path by a distance $\Delta z$, in such a way that the recombination of the secondary beams 6, 7 in the second splitter 9, the pulse of the second secondary beam 7 is delayed with respect to the pulse of the first secondary beam 6 by a duration $\Delta t$:

$$\Delta t = \frac{2\Delta z}{c}$$

with c the speed of light.

The initial laser beam, the secondary laser beams 6, 7 and the laser beam coming from the second splitter 9 pass through different optical members, in particular for formatting, such as for example lenses, not shown for reasons of simplicity. However, it shall be noted that it is possible to arrange retarder plates 5a and polarisers 5b on the optical paths of the secondary beams 6, 7, so as to modify the polarisations of the light beams. In particular, the polarisers 5b of the optical paths of the secondary beams 6, 7 are more preferably different so that the secondary laser beams 6, 7 have different polarisations, which results in pulses with different polarisations in the laser beam. Preferably, the polarisers 5b of the optical paths of the secondary beams 6, 7 are linear cross-polarisers. Preferably, the retarder plates 5a are half-wave plates that introduce a delay of λ/2, where λ is the wavelength of the laser beam. Of course, it is possible to modify the dispositions and characteristics of the different optical members according to the characteristics that are sought to be obtained in the laser beam that irradiates the surface of the material.

The laser beam then travels to the sample 10 of the material of which it irradiates the surface. Due to the differences between the optical paths of the secondary beams 6, 7, the laser beam has two pulses, preferably polarised differently.

The material is a solid material. It has been observed that it is possible to nanostructure in a similar way the surface of materials that are very different. The material can be any type of solid material that can produce at its surface a regular pattern of nanostructures having a spatial periodicity lower than 130 nm (or 100 nm) when this surface is irradiated in accordance with the process.

Thus, the material can be amorphous, and can be mostly constituted of carbon. Preferably, the material then contains diamond-like carbon, and is preferably mostly constituted of diamond-like carbon, and more preferably is diamond-like carbon.

Inversely, it is possible that the solid material has a crystalline structure, i.e. it is not amorphous. Typically, the material is polycrystalline, but it can also be monocrystalline. The material can also be an alloy that makes use of such materials. Preferably, the material is then mostly constituted of metal. Also preferably, the material has a crystalline face-centred cubic structure. For the purposes of illustration, the examples described hereinafter implement nickel (100). Preferably, the material is nickel, copper, gold, iron, silver, platinum, indium, palladium, titanium, or an alloy comprising the latter.

The solid material has a surface to be irradiated by laser. The process does not require any particular preparation of the surface. It is not necessary to pre-structure the latter or to cover it with a particular coating. It is also not necessary to place the material to be irradiated in particular conditions, in terms of pressure or temperature. Thus, the process is characterised by its low implementation constraints in order to obtain the sought effect, namely the obtaining of a regular pattern of nanostructures having a spatial periodicity lower than 130 nm. It is sufficient that the surface be clean and sufficiently flat over a space corresponding to the diameter of the section of the laser beam transversal to the direction of propagation of the laser (typically from a few micrometres to several hundred micrometres).

During the process, this surface of the material is irradiated by the laser beam. It is to be noted that the surface to be irradiated of the material is generally very large with respect to the diameter of the section of the laser beam transversal to the direction of propagation of the laser, in such way that the irradiation of the surface is done portion by portion, with each portion corresponding approximately to the diameter of the laser beam. However, the process is characterised in particular by the fact that it is possible for the irradiated portions of the surface to overlap partially without the continuity or the periodicity of the nanostructures obtained being interrupted. Thus, the different portions of the surface can be irradiated successively without a border zone appearing between them. It is also possible to continuously scan the irradiated surface when each portion to be irradiated of the surface is irradiated according to the process. It is thus possible to treat a large surface, with no limitation other than the constraints of the displacement of the sample 10 and/or of the laser, many samples 10 having a surface area to irradiate that is much greater than the size of the laser beam.

The wavelength of the laser can typically be between 400 nm and 1,030 nm, such as for example 800 nm in the examples hereinafter. The laser beam irradiating a portion of the surface comprises a plurality of pulse trains, with each pulse train comprising at least two pulses. Preferably, each pulse train comprises two or three pulses. FIG. 2A shows a diagrammatical example of a pulse train 20 that comprises two pulses 21, 22. Thus shown, the two pulses 21, 22 preferably have the same characteristics in terms of fluence profile. In fact, the two pulses are typically from the same initial pulse, thanks to a conditioning as described in reference to FIG. 1. In particular, the two pulses 21, 22 preferably have the same peak fluence. It is however possible that the two pulses have different fluence profiles, and in particular different peak fluences. It would be necessary for this to modify one of the optical paths 6, 7, for example by placing therein an attenuator or by redividing one of the optical paths 6, 7, which would complicate the installation, or modify the splitting of the beams, for example with a first splitter 4 with a distribution of the light intensity that is unequal between the optical paths 6, 7.

Each pulse 21, 22 has a peak fluence that is less than a threshold fluence that corresponds to an material ablation threshold for one pulse for the material to be irradiated. This is more precisely energy fluence that corresponds to the energy received per surface unit. The peak fluence Fs can be calculated by the following formula:

$$Fs = \frac{2 \times E}{\pi \times w^2}$$

with E the energy of the pulse, and 2w the width of the beam (or "waist") of the pulse with a Gaussian approximation (for example about 50 μm). The fluence is mainly controlled by means of the femtosecond laser source 1.

The threshold fluence corresponds to the energy fluence that allows an isolated laser pulse to cause an ablation of material on the irradiated surface. This ablation threshold varies according to the materials. In order to determine the adequate ablation threshold, it is possible to use the method proposed in the article of J. M. Liu, "Simple technique for measurements of pulsed Gaussian-beam spot sizes", OPTICS LETTERS, col. 7, no. 5, May 1982, p.196-198. In this method, a surface is irradiated with laser pulses that have different fluence values. For sufficiently high fluences, craters are formed on the surface due to the ablation of material caused by the laser impacts. These craters have diameters that increase with the fluence that formed them. By extrapolating the plot of the square of the diameters according to the fluence, the ablation threshold is found. The article of Hashida et al. "Ablation thresholds of metals with femtosecond laser pulses", 2001, proc. SPIE vol. 4423, p.179-185 also discusses the determination of the ablation threshold among other via this searching for the minimum diameter of the crater.

For example, the fluence of the ablation threshold at one pulse of a duration of 50 fs at a wavelength of 800 nm for nickel (100) is about 0.4 J/cm$^2$, with an energy of 40 µJ and a half-width of the beam w of 25 µm (peak power of 3.9 mW).

It shall be noted that the fluence of the one pulse ablation threshold depends on several parameters, and that this fluence of the ablation threshold must therefore be determined according to the other parameters used in the context of the irradiation of the surface. For example, the fluence of the ablation threshold for metals depends on the duration of the pulse, as mentioned in the article of Okamuro et al. "Laser fluence dependence of periodic grating structures formed on metal surfaces under femtosecond laser pulse irradiation", Physical Review B 82, 165417 (2010).

The sum of the peak fluences of the pulses of a pulse train must be sufficiently less than a threshold fluence corresponding to a material ablation threshold for one pulse for said material in order to allow for the formation of a regular pattern of nanostructures having a spatial periodicity lower than 130 nm, more preferably (strictly) less than 100 nm. Thus the sum of the peak fluences of the pulses of a pulse train is less than 70% of the threshold fluence corresponding to a material ablation threshold for one pulse for said material. It is necessary however for the irradiation to be sufficient to cause the appearance of the nanostructures. Preferably, the sum of the peak fluences of the impulsions of a pulse train is greater than 10% of the threshold fluence corresponding to a material ablation threshold for one pulse for said material, and more preferably greater than 20%, and more preferably 30%.

Furthermore, so as to allow for the formation of a regular pattern of nano-pits or of nano-bumps that form a regular lattice having a spatial periodicity lower than 100 nm, it is preferable that this sum of peak fluences of the pulses of a pulse train be sufficiently high. Thus, the sum of the peak fluences of the pulses of a pulse train is more preferably greater than 48% of the threshold fluence corresponding to the material ablation threshold for one pulse for said material.

Moreover, it is preferable that each pulse of the pulse train has a sufficient peak fluence so that the supply of energy at the surface is effectively carried out by several impulsions. Thus, each pulse preferably has a peak fluence greater than 5% of a threshold fluence corresponding to a material ablation threshold for one pulse for said material, and more preferably greater than 10%, and more preferably greater than 20%. Therefore, each pulse has a peak fluence less than 65% of a threshold fluence corresponding to a material ablation threshold for one pulse for said material, and more preferably less than 60%, and more preferably less than 50%.

In a typical case, the peak fluences of the pulses 21, 22 of a pulse train 20 are substantially equal, and therefore each present pulse 21, 22 can have a peak fluence between 15% and 35% of a threshold fluence corresponding to a material ablation threshold for one pulse for said material.

Preferably, the sum of the peak fluences of the pulses 21, 22 of a pulse train 20 is less than the ablation threshold. Preferably, each pulse 21, 22 has a peak fluence between 5% and 60% of a threshold fluence corresponding to a material ablation threshold for a pulse for the material to be irradiated.

Two consecutive pulses 21, 22 of a pulse train 20 are temporally separated by a peak-to-peak duration ΔT comprised between 500 fs and 150 ps (preferably strictly), preferably between 2 ps and 80 ps (preferably strictly), and more preferably between 5 and 70 ps (preferably strictly), more preferably between 10 and 50 (preferably strictly), and more preferably between 15 and 30 ps (preferably strictly).

The peak-to-peak duration ΔT between two consecutive pulses 21, 22 of a pulse train 20 can be chosen according to other parameters, and in particular according to the type of regular pattern of nanostructure that is sought to be obtained. For example, when a regular pattern of nano-pits is sought for a material with a crystalline face-centred cubic structure such as nickel, the duration ΔT is preferably between 5 ps and 70 ps, more preferably between 15 ps and 30 ps, while for the search for a pattern of nano-bumps for the same material, the duration ΔT is preferably between 1 ps and 25 ps, more preferably between 3 ps and 15 ps.

When a conditioning such as the one of FIG. 1 is used, this duration Δt between the two pulses 21, 22 corresponds to the duration Δt of which the pulse of the second secondary beam 7 is delayed in relation to the pulse of the first secondary beam 6. Each impulsion 21, 22 of a pulse train 20 has a duration less than the duration ΔT between two consecutive pulses of the pulse train. For example, each pulse 21, 22 of a pulse train 20 has a duration less than 400 fs, and preferably less than 300 fs.

The laser beam comprises a plurality of successive pulse trains such as shown in FIG. 2B where two pulse trains 20a and 20b follow one another, each one comprised of two pulses 21, 22. Typically, the successive pulse trains 20a, 20b are identical and have identical pulses 21, 22. Two consecutive pulse trains 20a, 20b are temporally separated by a duration D greater than 10 ΔT, measured peak-to-peak for the respective corresponding pulses of each pulse train, even greater than 100 ΔT, or even 1,000 ΔT, and more often greater than $10^5$ ΔT. Thus, the duration D between two consecutive pulse trains 20a, 20b is very long with respect to the duration ΔT between two consecutive pulses 21, 22 of a pulse train 20. In the example of FIG. 2B, this duration D corresponds to the time between the peak of the first pulse of the first pulse train 20a and the peak of the first pulse of the second pulse train 20b. The duration D between two consecutive pulse trains 20a, 20b corresponds to the frequency at which the femtosecond laser source 1 emits the initial pulses. For example, when the femtosecond laser source 1 emits with a repetition rate of 1 kHz, the duration D is 1 ms, which is $10^7$ times a duration ΔT of 100 ps.

Preferably, each portion of the surface to be irradiated is irradiated by at least 5 pulse trains, and preferably by at least 10 pulse trains. Preferably, each portion of the surface is irradiated by a number of pulse trains less than 500 (preferably strictly), preferably less than 100 (preferably strictly), and more preferably less than 50 (preferably strictly).

Like other parameters, the adequate number of pulse trains depends on several factors, such as the material, the peak fluence of pulses or the duration ΔT between two consecutive pulses of a pulse train. In fact, several parameters are linked together, but it is easy to determine the suitable parameters according to the configuration used. The examples hereinbelow show the main parameters at play that influence the nanostructuring of the surface in the case of nickel and a laser at 800 nm. Those skilled in the art can then easily determine the values of the parameters to be used for another configuration through a few tests, by varying the values of the parameters around those indicated and by seeking to obtain a regular pattern of nanostructures having a spatial periodicity lower than 130 nm, and preferably (strictly) less than 100 nm.

FIGS. 3A, 3B, 3C, 4A, 4B, 4C, 5A, 5B, 5C, 6A, 6B, 6C are images acquired by scanning electron microscopy showing the change in the structuring of a surface irradiated by laser by varying the parameters of this irradiation. Unless mentioned otherwise, the following parameters were used:
material of the surface: nickel (100),
wavelength: 800 nm,
one pulse ablation threshold: 0.4 J/cm$^2$,
pulse train comprised of two consecutive pulses (pulse doublet),
duration $\Delta T$ between two consecutive pulses of a pulse train: 22 ps
rate of repetition (between two trains): 1 kHz,
sum of the peak fluences of the pulses of a pulse train: 0.24 J/cm$^2$
duration of each pulse: 50 fs
number of pulse trains: 25
linear cross-polarisations between the two consecutive pulses.

FIGS. 3A to 3C show the influence of the number of pulse trains on the structuring of a surface irradiated by laser. The other parameters are those mentioned hereinabove. FIG. 3A shows the surface after a single pulse train. The structure of the surface is not altered, which means that the number of pulse trains was not sufficient for this configuration. FIG. 3B shows the surface after 25 pulse trains. It is observed that nanostructures form a regular pattern comprised of nano-pits regularly distributed in a lattice at the surface (a mesh of nano-pits), with a periodicity less than 100 nm. FIG. 3C shows a surface after the irradiation by 30 laser pulse trains. Although the regular pattern of the nanostructures still seems present in the background, it is observed the appearance of additional structures with a size much greater and which disturb the regular pattern, spaced at distances much greater than the two adjacent nano-pits are.

It is therefore observed that if a certain number of pulse trains is required to create the regular pattern, it is preferable to limit the number of pulse trains so as to not destroy the regular pattern of the nanostructures obtained. Thus for nickel and similar materials, each portion of the surface to be irradiated is irradiated by a number of pulse trains less than 30 pulses.

FIGS. 4A to 4C show the influence of the peak fluence of pulses on the structuring of a surface irradiated by laser. The other parameters are those mentioned hereinabove. FIG. 4A shows the surface after an irradiation with pulse trains of which the sum of the peak fluences of the pulses is 0.19 J/cm$^2$. The structure of the surface was indeed altered, and nanostructures appear on the surface. However, these nanostructures do not form a regular pattern of nano-pits that form a regular lattice. FIG. 4B shows the surface after an irradiation with pulse trains of which the sum of the peak fluences of the pulses is 0.24 J/cm$^2$. It is observed that nanostructures form a regular pattern comprised of nano-pits regularly distributed in a lattice on the surface (a mesh of nano-pits), with a periodicity less than 100 nm. FIG. 4C shows the surface after an irradiation with pulse trains of which the sum of the peak fluences of the pulses is 0.3 J/cm$^2$. It is observed that the surface is highly altered, with a chaotic structuring, without any distinguishable periodicity. The sum of the peak fluences of the pulses of the pulse train is too high in relation to the threshold fluence at a pulse to allow for the formation of a regular pattern of nanostructures having a periodicity. In the example with nickel, with a one pulse ablation threshold at 0.4 J/cm$^2$, the sum of the peak fluences of the pulses of the pulse train is preferably between 0.19 J/cm$^2$ and 0.3 J/cm$^2$.

FIGS. 5A to 5C show the influence of the peak-to-peak duration $\Delta T$ between two consecutive pulses of a pulse train on the structuring of a surface irradiated by laser. The other parameters are those mentioned hereinabove. FIG. 5A shows the surface after an irradiation by a pulse train comprising two consecutive pulses separated by a duration $\Delta T$ of 10 ps. It is observed that the surface is highly altered, with a chaotic structuring, without any distinguishable periodicity. The duration $\Delta T$ is therefore too short: the two consecutive pulses of the pulse train are too close. FIG. 5B shows the surface after an irradiation by a pulse train comprising two consecutive pulses separated by a duration $\Delta T$ of 22 ps. It is observed that nanostructures form a regular pattern comprised of nano-pits regularly distributed in a lattice at the surface (a mesh of nano-pits), with a periodicity less than 100 nm. FIG. 5C shows the surface after an irradiation by a pulse train comprising two consecutive pulses separated by a duration $\Delta T$ of 38 ps. The structure of the surface was indeed altered, and nanostructures appear on the surface. However, these nanostructures do not form a regular pattern of nano-pits that form a regular lattice. This duration $\Delta T$ is therefore suitable for causing nanostructures to appear, but too spaced apart to cause a regular pattern of nano-pits to appear that form a regular lattice, or a mesh of nano-pits.

In order to make it possible to obtain a regular pattern of nanostructures on the surface, the peak-to-peak duration $\Delta T$ that separates consecutive pulses of a pulse train is therefore more preferably comprised within a suitable range, which depends in particular on the material and the configuration of the irradiation. For nickel, with a wavelength of 800 nm, the peak-to-peak duration $\Delta T$ that separates consecutive pulses of a pulse train is greater than 10 ps. Moreover, to obtain a regular pattern of nano-pits that form a regular lattice, the peak-to-peak duration $\Delta T$ that separates consecutive pulses of a pulse train is more preferably less than 38 ps. Thus, two consecutive pulses 21, 22 of a pulse train 20 are temporally separated by a peak-to-peak duration $\Delta T$ preferably between 10 and 38 ps.

FIGS. 6A to 6C show the change in the structuring of a surface irradiated by laser according to the orientation of the polarisation at the surface of each one of the pulses of a pulse train. FIG. 6A shows the surface after an irradiation during which the pulses of a pulse train have parallel linear polarisations. The structure of the surface was indeed altered, and a regular pattern of nanostructures having a spatial periodicity lower than 100 nm appears on the surface. However, these nanostructures do not form a regular pattern of nano-pits that form a regular lattice. FIG. 6B shows the surface after an irradiation during which the pulses of a pulse train have linear orthogonal- or cross-polarisations, the orientation of the polarisation of a pulse being orthogonal to the orientation of the polarisation of the other pulse of the same pulse train. It is observed that nanostructures form a regular pattern comprised of nano-pits regularly distributed in a lattice at the surface, with a periodicity less than 100 nm.

FIG. 6C shows the surface after an irradiation during which the pulses of a pulse train have non-parallel and non-orthogonal linear polarisations. It is observed that the surface is structured in a way similar to the example shown in FIG. 6A, with a regular pattern of nanostructures having a spatial periodicity lower than 100 nm without however these nanostructures forming a regular pattern of nano-pits that form a regular lattice. However, these nanostructures have in their organisation an orientation that is different from that of FIG. 6A: this orientation of the nanostructures depends on the angle between the orientations of the polarisations of the pulses. Consequently, pulses of a pulse train preferably have linear (straight) polarisations that are different (with different orientations) when said pulses arrive on the surface. This characteristic makes it possible to control the orientation of the nanostructures.

Only linear cross-polarisations of pulses of a pulse train make it possible to obtain a regular pattern of nano-pits that form a regular lattice. Consequently, pulses of a pulse train preferably have linear cross-polarisations.

The nano-pits obtained have the form of cavities that open onto the surface with a diameter between 10 nm and 40 nm, and preferably between 20 nm and 30 nm. When the material has a thickness under its surface less than 200 nm, even less than 100 nm, it is possible that the nano-pits take the form of cavities that pass through the material. This is then referred to as nano-holes. A thin layer of material provided with a mesh of nano-holes can then be obtained.

FIGS. 7A and 7B are images acquired by scanning electron microscopy showing the regular pattern of nanostructures obtained on the planar surface of a sample of diamond-like carbon.

The following parameters were used:
material of the surface: nickel (100),
wavelength: 800 nm,
pulse train comprised of two consecutive pulses (pulse doublet),
duration ΔT between two consecutive pulses of a pulse train: 60 ps,
rate of repetition (between two trains): 1 kHz,
sum of the peak fluences of the pulses of a pulse train: 0.3 J/cm$^2$ (0.15 J/cm$^2$ per pulse),
duration of each pulse: 50 fs,
number of pulse trains: 25,
linear cross-polarisations between the two consecutive pulses.

FIG. 7A shows the surface of the sample not tilted in the scanning electron microscope, while FIG. 7B shows the surface of the sample tilted 40° in the scanning electron microscope, so as to show the nano-bumps obtained better. The appearance of regular nano-bumps on the surface is observed, and therefore the nano-structuring of the surface. It is observed that nanostructures form a regular pattern composed of nano-bumps regularly distributed in a lattice at the surface, with a periodicity less than 130 nm.

FIG. 7C is a curve showing the radial averaged autocorrelation (RAA) according to the distance, determined on an image obtained by an atomic force microscope, indicated here as a function of a distance in μm. This curve makes it possible to finely characterise the pattern obtained. The first zero, at 46 nm, indicates the average dimension of the nano-bumps (in the plane of the surface), while the first peak at 110 nm indicates the spatial periodicity of the nano-bumps (in the plane of the surface).

With respect to the preceding examples where nickel was used and nano-holes obtained, the only parameters that have changed slightly are the duration ΔT between two consecutive pulses of a pulse train (60 ps instead of 22 ps) and the sum of the peak fluences of the pulses of a pulse train (0.3 J/cm$^2$ instead of 0.24 J/cm$^2$). It is therefore seen that the process can be used to obtain a regular pattern of nanostructures on very different materials, despite very similar parameters. The teachings of an embodiment are therefore easily transposable from one material to the other.

Likewise, it is possible to obtain nano-bumps by using nickel, by using the same parameters as in the preceding examples where nano-holes were obtained, except for the peak-to-peak duration ΔT between two consecutive pulses of a pulse train 20 that is reduced (for example to 8 ps instead of 22 ps) and of the sum of the peak fluences of the pulses of a pulse train, that is also reduced (for example to 0.2 J/cm$^2$ instead of 0.24 J/cm$^2$). It is therefore possible to obtain either nano-bumps, or nano-holes, by slightly modifying the parameters of the process.

The invention is not limited to the embodiment described and shown in the accompanying figures. Modifications remain possible, in particular from the point of view of the constitution of the various technical characteristics or by substitution of technical equivalents, without leaving the scope of the protective field of the invention.

The invention claimed is:

1. Process for nanostructuring a surface of a solid material in order to form a regular pattern of nanostructures on said surface, said process comprising:
    supplying the solid material, said material comprising the surface;
    irradiating a portion of the surface by a femtosecond laser beam, comprising a plurality of pulse trains, wherein:
        each pulse train comprises at least two pulses,
        each pulse has a peak fluence, and a sum of the peak fluences of the pulses of a pulse train is between 10% and 70% of a threshold fluence corresponding to a material ablation threshold for one pulse for said material,
        two consecutive pulses of a pulse train are temporally separated by a peak-to-peak duration ΔT between 500 fs and 150 ps,
        two consecutive pulse trains are temporally separated by a duration greater than 10 ΔT,
    obtaining of a regular pattern of nanostructures on said portion of the surface, having a spatial periodicity lower than 130 nm,
    displacing the femtosecond laser beam on the surface in such a way as to irradiate other portions of said surface.

2. Process according to claim 1, wherein each pulse has a peak fluence between 5% and 65% of a threshold fluence corresponding to a material ablation threshold for one pulse for said material.

3. Process according to claim 1, wherein the irradiating by the plurality of pulse trains on a same surface portion represents a total dose less than 6 J/cm$^2$.

4. Process according to claim 1, wherein each portion of the surface is irradiated by at least 5 pulse trains.

5. Process according to claim 1, wherein each portion of the surface is irradiated by a number of pulse trains less than 500.

6. Process according to claim 1, wherein each pulse of a pulse train has a duration less than the duration ΔT between two consecutive pulses of the pulse train.

7. Process according to claim 1, wherein the material has a crystalline structure, and in particular a face-centred cubic structure.

8. Process according to claim 1, wherein the material contains diamond-like carbon.

9. Process according to claim 1, wherein pulses of a pulse train have different linear polarisations when said pulses arrive on the surface.

10. Process according to claim 9, wherein pulses of a pulse train have linear cross-polarisations.

11. Process according to claim 1, wherein the nanostructures obtained are nano-pits or nano-holes and/or nano-bumps, forming a regular lattice on the surface.

12. Process according to claim 11, wherein the nano-pits have a diameter between 10 nm and 40 nm, and preferably between 20 nm and 30 nm.

13. Process according to claim 1, wherein the irradiated portions of the surface overlap partially.

14. Process according to claim 1, wherein the material has a thickness less than 200 nm.

* * * * *